United States Patent [19]

Todaro

[11] 4,217,691
[45] Aug. 19, 1980

[54] AUTOMATIC WIRE STRIPPER
[76] Inventor: Anthony Todaro, 122-40 133rd Ave., South Ozone Park, N.Y. 11420
[21] Appl. No.: 33,749
[22] Filed: Apr. 26, 1979
[51] Int. Cl.³ ............................................. H02G 1/12
[52] U.S. Cl. ................................................... 30/90.1
[58] Field of Search .................. 81/9.5 R, 9.5 B, 9.5 C
[56] References Cited
U.S. PATENT DOCUMENTS

| 3,080,469 | 3/1963 | Benoit | 81/9.5 R |
| 3,114,277 | 12/1963 | Clendenin | 30/90.1 |

FOREIGN PATENT DOCUMENTS 2644935 4/1978 Fed. Rep. of Germany ......... 81/9.5 R

Primary Examiner—Othell M. Simpson
Assistant Examiner—Roscoe V. Parker
Attorney, Agent, or Firm—Richard L. Miller

[57] ABSTRACT

A wire stripper formed of an elongated housing having a notched section which divides the housing into a forward head portion and a rearward body portion. A fixed blade is securely retained in the head portion and extends into the notched section. A hollow chamber formed in the body portion includes a leaf spring having a movable blade supported at its forward end and also extending into the notched section in opposition to the fixed blade. Together, the blades cooperatively define a wire receiving and stripping throat. An actuating lever extends through an elongated opening in the housing and into engagement with the leaf spring to move the leaf spring between a forward and rearward position whereby the movable blade can be spaced from the fixed blade to thereby receive the wire and can then be forwardly biased against the fixed blade to thereby cut and strip the wire.

12 Claims, 8 Drawing Figures

AUTOMATIC WIRE STRIPPER

BACKGROUND OF THE INVENTION

This invention relates to a wire stripper, and more particularly to a device which can simply and easily strip wire using a simplified mechanism with easy operation.

Most electrical wire includes one or a plurality of electrically conductive strands which are surrounded by an insulative coating. In order to make electrical interconnections with the wire, it is necessary to strip the insulation off the wire thereby revealing the electrical strands therebeneath. Numerous wire strippers are readily available for achieving this purpose. Most of the available wire strippers are of the scissors or pliers type, having criss crossed handles and jaws.

The wire is inserted into the jaws and the handles are clamped together thereby shearing and cutting the insulation whereby the insulation portion can be slid off the wire thereby exposing the wire therebeneath.

Numerous other types of wire strippers are readily available which operate to either shear, slice, or otherwise sever the insulation whereby the insulation can be slid off the wire to uncover the electrical strands therebeneath. One of the problems with most prior art devices concerns its cumbersomeness. Especially with those of the scissors type, the space required for storing and holding the wire stripper is fairly large. Accordingly, a considerable amount of space must be provided when storing the wire stripper on a shelf and a corresponding space must be provided when transporting the device. This is especially awkward for field men who must carry the wire stripper, along with numerous other tools, out into the field. The size of the regular wire stripper often makes it cumbersome to carry about with ease.

Still another problem of most prior art wire strippers concerns the lack of capability of replacing the blades. After continued usage, the blades tend to become dull and the cutting of the insulation and stripping of the wire becomes more difficult. However, most wire strippers, especially of the pliers type, have the blades permanently connected or integrally formed with the body of the wire stripper itself and when the blades get dull they must either be sharpened or the entire wire stripper must be replaced.

SUMMARY OF THE INVENTION

It is accordingly an object of the present invention to provide a wire stripper which avoids the aforementioned problems of prior art devices.

Another object of the present invention is to provide a wire stripper which can be easily manipulated utilizing only one hand.

A further object of the present invention is to provide a wire stripper which is compact, requires a small amount of space, can be easily stored, and easily transported.

Still another object of the present invention is to provide a wire stripper wherein the blades can be easily replaced after they become dull and worn.

Yet a further object of the present invention is to provide a wire stripper which is easily constructed, reduced in cost, durable, sturdy, and easy to operate.

Yet another object of the present invention is to provide a wire stripper which can automatically accommodate wires of numerous sizes and thicknesses.

Briefly, in accordance with the present invention, there is provided a wire stripper comprising an elongated housing. A notched section formed in the housing divides the housing into a forward head portion and a rearward body portion. A fixed blade is securely retained in the head portion and extends partway into the notched section. A hollow chamber is formed in the body portion. An elongated opening is formed in the body portion in communication with the hollow chamber. An actuating lever is positioned in the elongated opening and extends into the chamber. A leaf spring in the chamber is retained by the actuating lever and longitudinally movable by means of the lever between a forward and rearward position. A movable blade is supported at the forward end of the leaf spring and longitudinally extends into the notched section in opposition to the fixed blade. The two blades cooperatively define therebetween a wire receiving and stripping throat section.

In an embodiment of the invention, a biasing means normally biases the leaf spring in a forward position wherby the actuating lever is utilized to move the leaf spring into a rearward position. Additionally, in an embodiment of the invention the leaf spring includes a vertically extending loop section at its mid part which is engaged by a recess in a pusher bar downwardly depending from the actuating lever. The biasing spring opposes rearward movement of the leaf spring whereby downward pressure of the pusher bar can push the forward end of the leaf spring and thereby press the movable blade forward to cut the insulation about its circular perimeter.

The foregoing and other objects, features and advantages of the invention will, in part, become obvious from the following more detailed description of the invention, taken in conjunction with the accompanying drawings which form an integral part thereof.

BRIEF DESCRIPTION OF THE DRAWING

In the drawings.

In the various figures of the drawing, like reference characters designate like parts.

DESCRIPTION OF THE PREFERRED EMBODIMENTS

Figure 1:
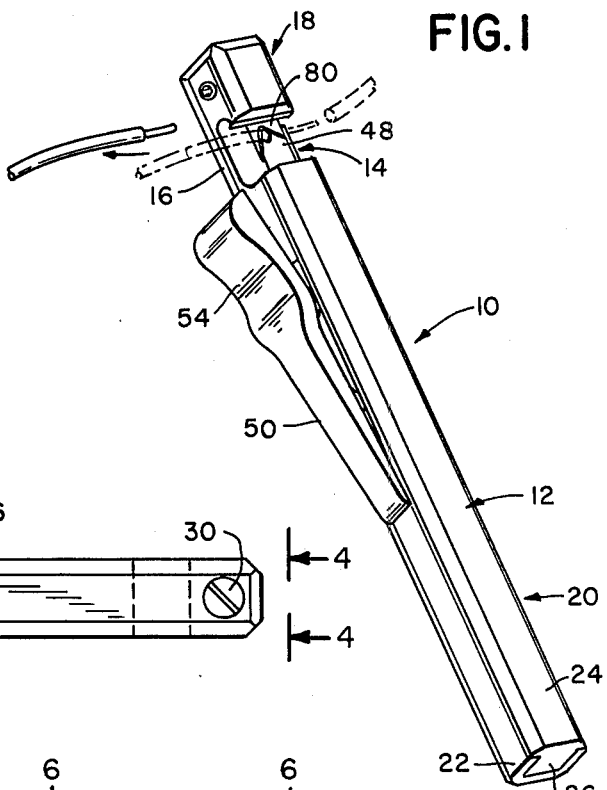
FIG. 1 is a perspective view of the device in accordance with the present invention.

Referring now to FIG. 1, there is generally shown the wire stripper 10 in accordance with the present invention generally. The wire stripper includes a housing 12 in which there is formed a notch 14. The notch is a transverse slot which extends through most of the housing and terminates inwardly of the rear wall 16. The notched section 14 divides the housing into a head portion 18 and a body portion 20.

Figure 3:
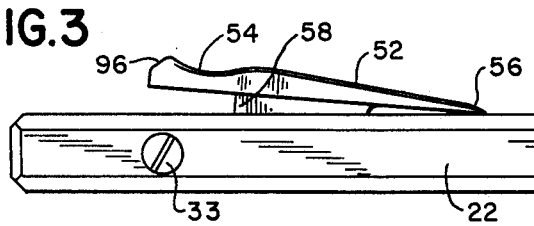
FIG. 3 is a side elevational view as viewed looking in the direction 3—3 of FIG. 2.
Figure 5:
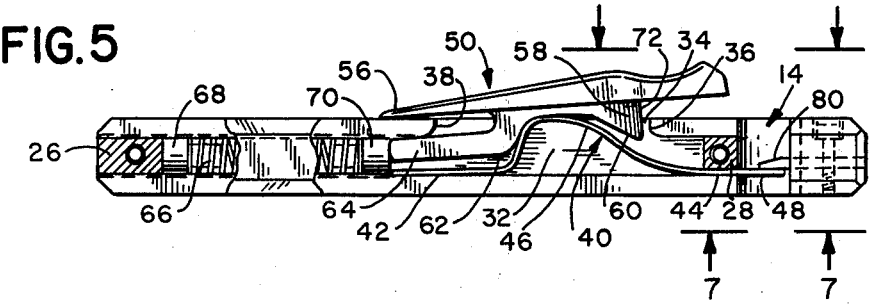
FIG. 5 is a side elevational view, with portions partially removed, and sectioned as taken when viewed in a direction along line 5—5 of FIG. 2.
Figure 4:
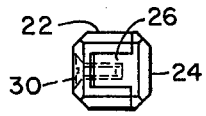
FIG. 4 is a rear elevational view as looking in the direction 4—4 shown in FIG. 3.

The body portion 20 of the housing is formed of a first part defined by an elongated U-shaped channel 22 and a cover part 24 which fits over the ends of the legs of the U-shaped channel and substantially covers the channel. As can best be noted in FIG. 5, the cover 24 includes a rear block 26 and a forward block 28. The blocks 26, 28 fit within the legs of the U-shaped channel and are respectively held in place by means of the rear screw 30 and the forward screw 33, as is best noted in FIG. 3. The rear block 26 seals off the end most portion of the housing while the forward block 28 is positioned rearward of the notched section 14. For convenience, the forward block is arcuately shaped where it meets the rear wall portion 16 so as to provide a smooth continuous connection. The front and rear blocks 26, 28 define with the U-shaped channel an internal hollow chamber 32. An elongated opening 34 is formed in the housing 24 to permit entry into the internal chamber 32. The opening 34 is bounded by the shoulders 36,38.

Positioned internally of the chambers is a leaf spring shown generally at 40 and including a substantially horizontal rearward tail portion 42, a substantially horizontal forward portion 44, and an intermediate loop section 46. A movable blade 48 is integrally connected at the front end of the forward portion and passes through a small thin passageway provided beneath the front block 28, whereby the blade can pass partially into the notched section 14.

Figure 6:
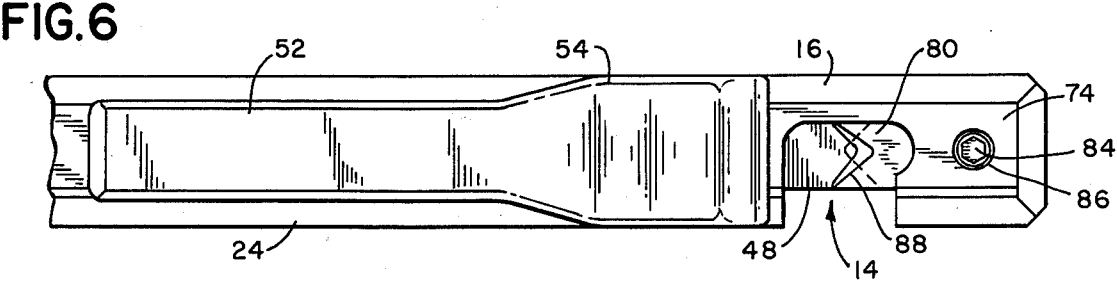
FIG. 6 is an enlarged partial top view looking in the direction along line 6—6 of FIG. 5.

An actuating lever shown generally at 50 is positioned so that it extends through the elongated opening 34 and into the internal chamber 32 while at the same time having a portion thereof externally positioned on the exterior of the housing 24. The exterior portion of the actuating lever is formed of a flat member 52 having a finger recess 54 in the forward portion thereof. As can best be seen in FIG. 6, the forward portion is wider and tapers down toward the narrower rear portion 52. The actuating lever is held in an angled position with the front end raised slightly higher than the lower end so that the rear or tail 56 is held on the housing 24.

Downwardly depending from the actuating lever is a pusher bar 58 having a recess or cammed surface 60 at its lower portion so as to receive the loop 46 of the leaf spring and capture or retain the leaf spring. The actuator bar follows the path of the leaf spring and includes the shoulder portion 62 which can hold the back end of the loop. The actuator bar terminates in a rearwardly directed tail portion 64. The tail portion 64 is spaced beneath the tail 56 of the actuator lever to define a channel therebetween which can receive the edge 38 of the top wall of the housing and retains the actuator lever in place by means of this channel.

Within the rear portion of the chamber 32 is positioned a biasing spring 66 having a plug 68 at its rear end and a plug 70 at its forward end. The rear end plug 68 abuts against the rear block 26 to hold the spring within the chamber. The forward plug 70 pushes against the tail end 42 of the leaf spring and also against the tail 64 of the pusher bar. The spring normally biases the leaf spring and accordingly the movable blade 48 in a forward position. The limit of the forward position is limited by the front end of the pusher bar and specifically the forward face 72 at the front of the portion 60.

Figure 2:
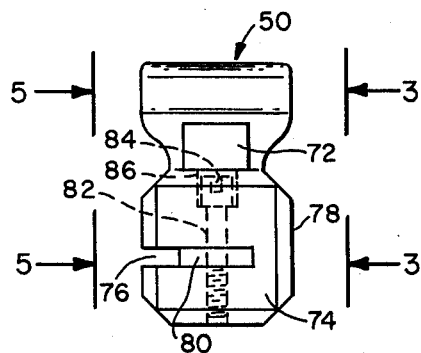
FIG. 2 is an enlarged front elevational view of the wire stripping device.

The head portion 18 is formed of a solid block, 74, as can best be seen in FIG. 2. A transverse slot 76 extends through the side of the head 74 and extends partially therethrough terminating inwardly from the side wall 78. Longitudinally extending within the slot is a fixed blade 80 which extends into the notched section 14 in opposition to the moving blade 48. The fixed blade is held in place by means of a clamping screw 82 extending through the fixed body 74 and through an opening in the fixed blade. The head 84 of the clamping screw is retained in a counter bore 86 formed in the top of the fixed body 74.

It will therefore be appreciated that the movable blade 48 and the fixed blade 80 cooperates to form a mechanism for receiving the wire and cutting the insulation to thereby strip the insulation from the wire. In order to facilitate such cutting and stripping the forward edge of at least one blade has its V-shaped notch downwardly tapered, as can best be noted in FIGS. 1 and 5, in order to provide a sharp cutting edge. As a result, the two blades interact together to slice the insulation and permit removal of the insulation from the underlying wire strands.

The operation of the wire stripper of the present invention is as follows:

Initially, the movable blade is biased in its forward most position by means of the spring. When a wire is to be stripped, the actuating lever is pulled back forcing the tail portion 64 of the pusher bar against the plug 70 to compress the spring and move it backward. The loop 46 of the leaf spring which is retained by the pusher bar is thereby also pushed back by means of the sloping surface 60. This pulls the movable blade 48 backwards within the notched section 14 which opens up the throat area between the fixed blade and the movable blade to accommodate and receive the wire to be stripped. In order to facilitate pulling back of the actuating lever, the front edge of the actuating lever is tapered at 96 in order to permit finger action on the actuating lever.

After the wire has been inserted between the fixed and movable blades to the length desired to be stripped, the actuating lever is released whereby the biasing spring forces the movable blade forward towards the fixed blade. The movement forward will clamp the wire between the movable blade and the fixed blade and will slightly commence the shearing action of the insulation. In order to complete the shearing and cutting of the insulation, the actuating lever is depressed by means of pushing down at the finger recessed depression 54. This causes the pusher bar 58 to push down on the loop 46 of the leaf spring. Since the rear of the leaf spring is forwardly biased by means of the spring 66, the forward end of the leaf spring which supports the movable blade is pushed forward into the insulation. As a result, the insulation on the wire held by the throat between the blades is cut. The wire strands within the insulation are not cut because of the increased resistance of the wire strands. and also because of the existing spaced apart throat 92 which is continuously maintained between the blades even in its fowardmost position.

As a result, the insulation is now partially severed and the wire strands are held in place at the throat portion. The wire is held by the throat and by sliding the wire cutter toward the end of the wire, the insulation which has been partially severed will be slid off the wire strands to thereby strip the wire strands of their insulation coating. The wire strands can then be removed from between the throat area.

Figure 8:
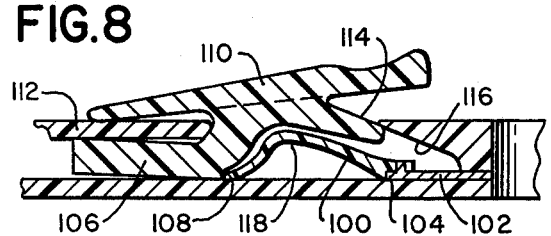
FIG. 8 is a partial sectional view of another embodiment of the present invention.
Figure 7:
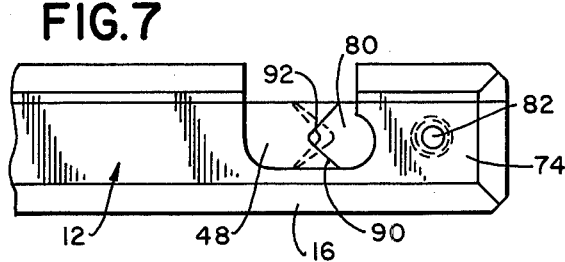
FIG. 7 is an enlarged partial bottom view as seen looking along the direction of line 7—7 of FIG. 5.

Referring now to FIG. 8, there is shown a second embodiment of the present invention. In this embodiment, it will be noted that the leaf spring 100 terminates within the internal chamber and the movable blade 102 is formed of a separate piece which is fastened to the forward end of the leaf spring by means of a fastening member 104 such a screw, rivet, or the like. The leaf spring itself can be formed of a single piece with the pusher rod 106 and an integral hinge 108 can interconnect the pusher rod and the leaf spring. In fact, the leaf spring does not have to extend beneath the pusher rod but can terminate at the commencement of the tail portion of the pusher rod.

The pusher rod itself can be formed of an integral piece with the actuating arm 110 which extends above the wall 112 of the housing. In this manner, the entire piece including the actuating lever, the pusher rod, and the leaf spring can all be formed of one piece of material. As is shown, all of the material forming this portion is of insulating material such as plastic, or the like. The blade is the only portion that is formed of a steel material.

In the embodiment shown in FIG. 8, the forward end of the pusher rod is formed of a downwardly sloping front edge 114 which slides against a corresponding downwardly sloping front edge formed in the forward block. The opening formed in the housing 112 is only sufficient to accommodate the pusher rod itself. It does not provide any rearward movement of the pusher rod, as was accommodated in the first embodiment. Specifically, it was noted that in the first embodiment, a channel was formed which can receive the sliding movement whereby the edge of the opening can move forward and rearward within the channel formed between the pusher rod and the actuating lever. In the embodiment shown in FIG. 8, no rearward movement can be formed.

The operation of the embodiment shown in FIG. 8 is that the actuating lever can only be moved downward and upward. The leaf spring, and specifically the loop portion 118 biases the actuating lever in an upward position. At the same time, with the leaf spring biased in its upward position, the movable blade 102 will be in its rear most position. The wire can then be inserted between the blades. The actuating lever need only be pushed downwardly which moves the movable blade forward and simultaneously retains the wire while shearing it by means of the downward force on the actuating lever which moves the movable blade forward.

It is therefore appreciated that in the embodiment shown in FIG. 8, there need not be required a biasing spring to normally bias the movable blade in its forward position. The movement of the movable blade between a forward and rearward position is carried out only by means of the actuating lever, and specifically the downward force on the actuating lever. Such downward force simultaneously provides the retention of the wire and the shearing action on the insulation.

It should be appreciated that the type of biasing arrangement shown in FIG. 8 can also be utilized in connection with the first embodiment. Similarly, the biasing arrangement shown in FIG. 8 could be modified whereby even though the blade is formed of a separate piece fastened to the leaf spring, a biasing spring could be utilized and the shape of the pusher rod could be modified similar to that shown in the first embodiment.

The material of the housing can be of any durable, sturdy material such as plastic, steel or the like. As shown in the various figures, the edges of the material are champhered to provide smooth corners and edges thereby avoiding sharp sections which might tend to cut during use.

It should be appreciated that the device of the present invention operates in a simplified manner and provides efficient wire stripping with simple manipulation. At the same time it is a very simple device, easy to manufacture, and occupies very limited space. Thus, the wire stripper can be carried in a pocket, tool case, or the like without requiring much room and can also be stored in a very small area.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

I claim:

1. A wire stripper comprising:
   An elongated housing, a notched section formed in said housing which divides said housing into a forward head portion and a rearward body portion;
   a fixed blade securely retained into said head portion and extending partway into said notched section;
   a hollow chamber formed in said body portion, an elongated opening formed in said body portion in communication with said hollow chamber;
   an actuating lever positioned in said elongated opening and extending into said chamber;
   a leaf spring in said chamber retained by said actuating lever and longitudinally movable by means of said lever between a forward and rearward position; and
   a movable blade supported by the forward end of the leaf spring and longitudinally extending into the notched section in opposition to said fixed blade and cooperatively defining therewith a wire receiving and stripping throat.

2. A wire stripper as in claim 1, and further comprising biasing means for normally biasing said leaf spring in a forward position, and wherein said actuating lever is utilized to move the leaf spring into its rearward position.

3. A wire stripper as in claim 2, wherein said biasing means comprises a compression spring contained within said chamber and abutting a rear end wall of said housing.

4. A wire stripper as in claim 1, wherein said leaf spring is substantially horizontal with a vertically extending loop portion at its mid section, said loop portion facing said elongated opening and wherein said actuating lever comprises a downwardly depending pusher bar having a recess for receiving said loop portion, and means for opposing the rearward movement of said leaf spring, whereby downward pressure of said pusher bar pushes the forward end of the leaf spring and the movable blade forward.

5. a wire stripper as in claim 1, wherein said leaf spring and said movable blade are integrally formed.

6. A wire stripper as in claim 1, wherein said movable blade is coupled to the end of said leaf spring.

7. A wire stripper as in claim 1, and further comprising an integral hinge interconnecting said leaf spring and said actuating lever.

8. A wire stripper as in claim 1, wherein the respective forward edges of said fixed and movable blades have a V-shaped notch with the bottom of the V extending away from each other, said blades respectively lying in adjacent parallel planes, and wherein said notches define said throat.

9. A wire stripper as in claim 1, wherein said housing comprises an elongated U-shaped channel extending through said body portion, a cover over said body portion, a depending block from said cover formed at the forward and rearward ends of said body portion, said depending blocks fitting within the legs of the U-shaped channel, fastening means for retaining said cover portion onto said U-shaped channel, and a passageway beneath said front block for receiving said movable blade.

10. A wire stripper as in claim 4, wherein said pusher bar comprises a rearwardly extending tail portion spaced from said actuating lever and defining with said actuating lever a channel for receiving therein the edge of the elongated opening.

11. A wire stripper as in claim 9, wherein said head portion comprises a solid block, a rear wall forming the back of the notched section and integrally connecting said body portion with said head portion, a transverse slot extending partially through said solid block for receiving therein said fixed blade, and retaining means for securely holding said fixed blade within said slot.

12. A wire stripper as in claim 8, wherein at least one blade has a tapered cutting edge.

* * * * *